June 24, 1930.  A. E. NIELSEN  1,767,010
BELT TIGHTENER FOR POWER UNITS
Filed Oct. 10, 1927  2 Sheets-Sheet 1

Inventor
Anton E. Nielsen
By his Attorney
John E. Prager

June 24, 1930.  A. E. NIELSEN  1,767,010
BELT TIGHTENER FOR POWER UNITS
Filed Oct. 10, 1927  2 Sheets-Sheet 2
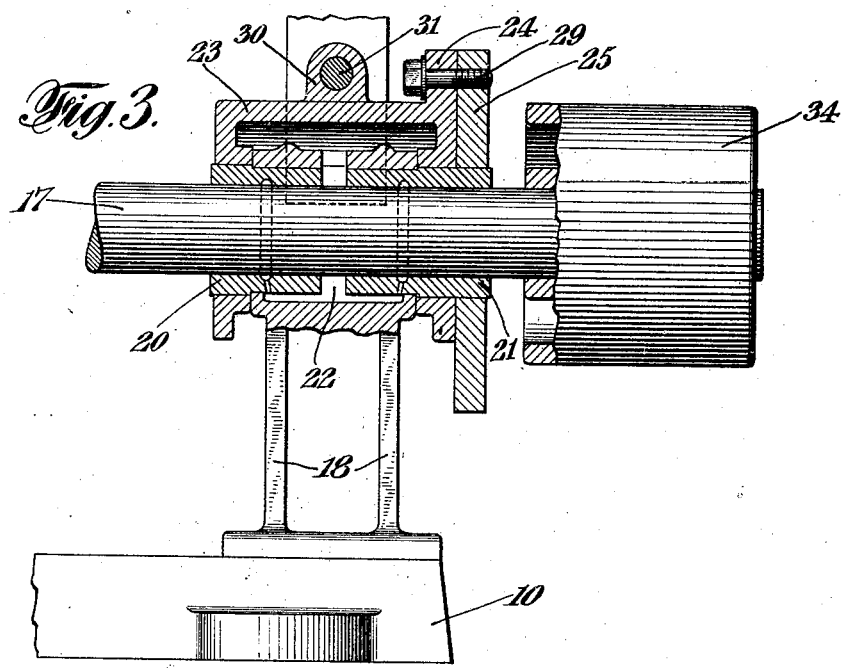
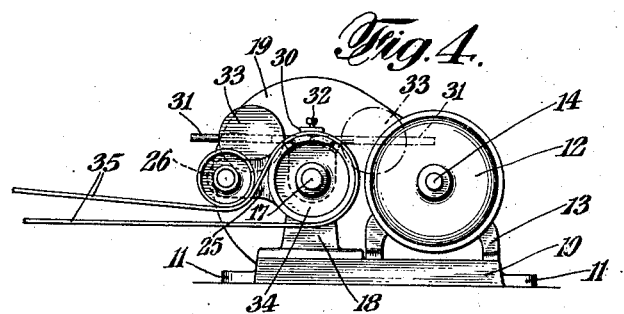
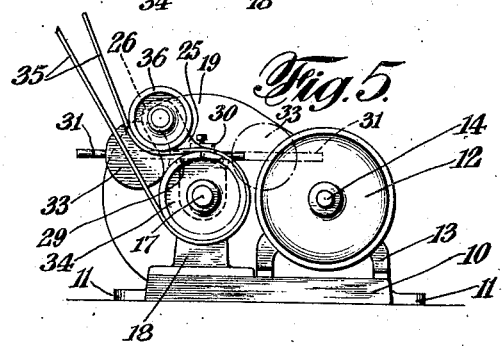
Inventor
Anton E. Nielsen
By his Attorney
John E. Prager Patented June 24, 1930

1,767,010

UNITED STATES PATENT OFFICE

ANTON E. NIELSEN, OF BROOKLYN, NEW YORK

BELT TIGHTENER FOR POWER UNITS

Application filed October 10, 1927. Serial No. 225,074.

This invention relates to power transmission devices, with special reference to belt drives between two parallel shafts, and more particularly to devices for maintaining a desirable belt tension.

Due to the ever widening use of electricity, its flexibility, convenience, accessibility and dependability, a multitude of motors are employed as drivers for mechanisms of widely variant types and purposes.

Such motors operate, at their best, at a speed far in excess of the usual requirements for the majority of machines, entailing the interposition of speed reducing means between the motor shaft and driving belt pulley shaft, as it is not regarded as good practice to run a belt beyond a certain lineal speed rate per minute determined by the character of the belt.

It further occurs that the direction of the belt, as vertical, horizontal or oblique, must be considered and, as the diameter of the driving pulley is usually relatively small as compared with the driven pulley, it is desirable to wrap the belt around the driver as much as possible in order to provide adequate frictional contact with its periphery to properly transmit the power.

It is also desirable to provide a power unit universally available irrespective of position and having a belt tightener adjustable concentrically with the driving pulley and on either side of the belt.

These several advantageous features, together with others which will become apparent as the description progresses, are accomplished by the novel, simple and practical construction and arrangement of parts, hereinafter clearly described and shown in the accompanying drawings, forming a material part of this disclosure, and in which:—

Figure 3 is an enlarged fragmentary sectional view taken on line 3—3 of Figure 2.

Figure 4 is an end view showing the drive as substantially horizontal, drawn to a diminished scale.

Figure 5 is a similar view of the same with the belts directed obliquely.

Figure 1:
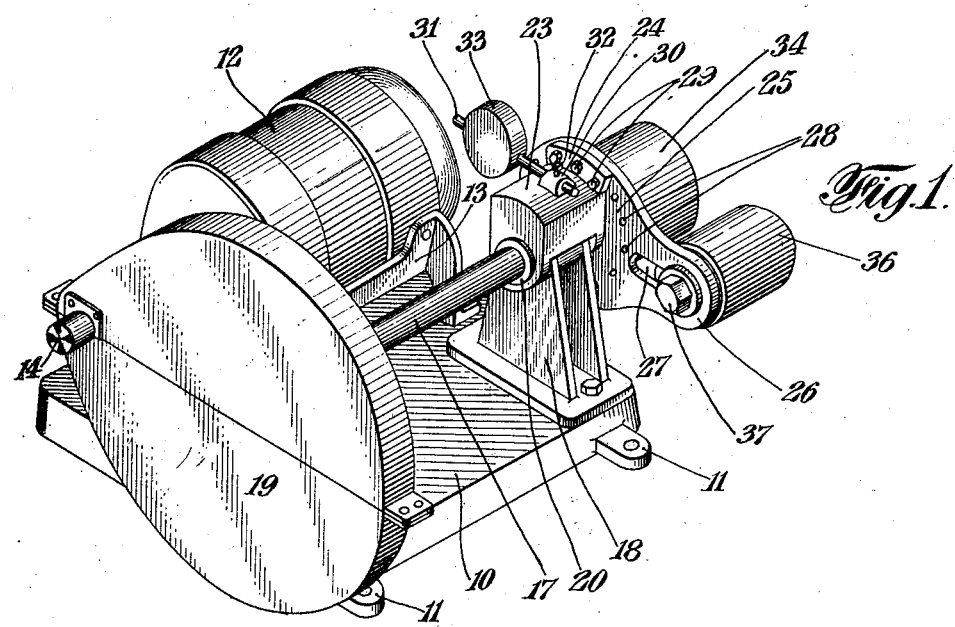
Figure 1 is a perspective view of a power unit, including a belt tightener, made in accordance with the invention.
Figure 2:
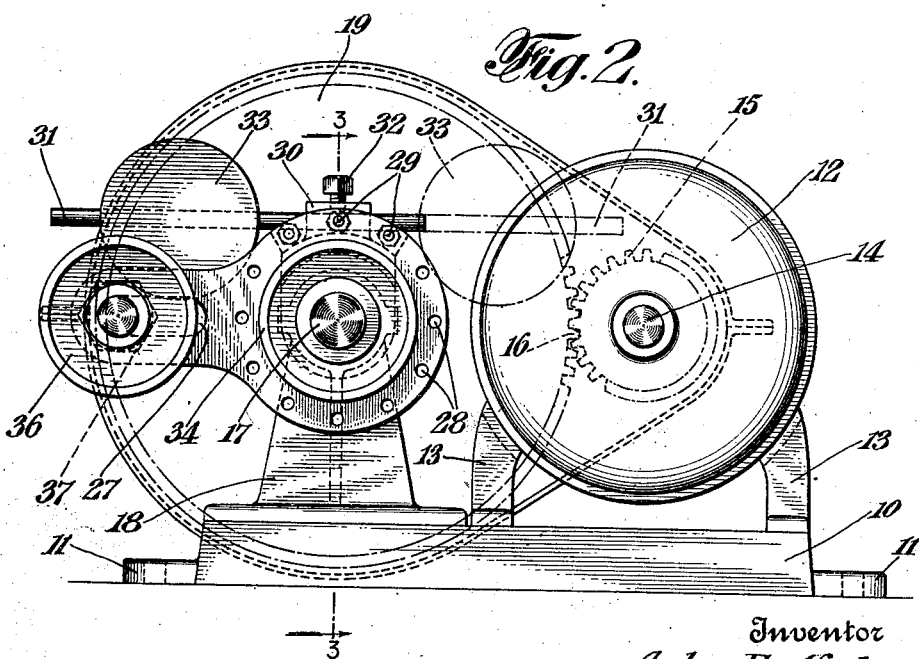
Figure 2 is a side elevational view of the same looking from the pulley side.

Describing the drawings in greater detail, the numeral 10 designates in general a substantially level platform or raised base provided with apertured lugs 11 by which it may be secured in any desired adjusted position.

At the rear of the platform is a conventional electric motor 12, held in position by a bracket 13, and having a shaft 14, on the outer portion of which is fixed a spur pinion 15.

Meshing with the pinion is a gear 16 fixed on a shaft 17, parallel with the axis of the motor, and revolubly mounted in a pair of pillow blocks 18 bolted to the front portion of the platform 10. A shroud or casing 19, preferably in two parts and bolted together, envelops the reducing gear train 15 and 16, as best seen in Figure 1.

The shaft 17 is journalled in brass bearings 20 and 21 set in the bore of the pillow blocks, which are recessed to provide oil chambers, as at 22, and extend out beyond the blocks at both ends as seen in Figure 3.

Freely mounted on the extending ends of the brasses is a frame 23 overlying the top of the pillow block and having at its outer front edge a raised arcuate flange 24.

Also rotatably mounted on the outer end of the brass 21 is a plate 25, generally circular, and having an extending arm 26 containing a slot 27, the plate having a circular row of equally spaced threaded openings 28 to receive screws 29 passing through the flange 24 to rigidly secure the plate 25 and frame 23 in juxtaposition but permitting the plate and its arm to be adjusted angularly with reference to the frame.

A lug 30, integral with the top of the frame 23, is bored to receive a spindle 31, disposed at a right angle to the axis of the shaft 17 and held in adjustment by a set screw 32 threaded into the top of the lug 30, this spindle adjustably carrying a weight block 33.

Fixed on the outer end of the shaft 17 is a drive pulley 34 around which is trained a driving belt 35 leading to a driven pulley on the mechanism to be actuated by the motor.

In order to keep this belt in a properly taut condition, the upper run is passed under an idle pulley 36 revolubly mounted on a spindle passed through the slot 27 in the arm 25 and held adjustably by a clamp nut 37.

From the foregoing it will be seen that the space between the peripheries of the pulleys 34 and 36 may be varied to suit requirements; that the idler 36 may be adjusted around the driver at any desired angle to the driving pulley concentric therewith, by means of the screws 29, and that the counterweight 33 may be adjusted to give any required tension to the belt, or even reversed in position from front to rear as seen in Figures 4 and 5.

As changes of construction could be made within the scope of the invention, it is intended that all matter contained in the foregoing description or shown in the accompanying drawings shall be interpreted as illustrative and not in a limiting sense.

Having thus described my invention, what I claim as new and desire to secure by Letters Patent, is:—

1. A belt tightener comprising in combination with a bearing, a drive shaft and pulley, of a frame journalled on said shaft to straddle the bearing whereby its rotative movement is limited, a radial arm mounted on said shaft intermediate the pulley and frame, said arm having spaced perforations disposed in a circle to receive bolts from said frame whereby it may be adjusted at any radial angular position, a counterweight for said arm adjustably carried by said frame, and an idle pulley carried by said arm adjustable with respect to the first named pulley.

2. A belt tightener comprising in combination with a bearing, a drive shaft and pulley, of a frame journalled on said shaft to straddle the bearing whereby its rotative movement is limited, a radial arm mounted on said shaft intermediate the pulley and frame, means for clamping said arm to said frame at any adjusted position within a complete circle, an idle pulley carried by said arm, means for adjusting the distance between the axes of said pulleys, and adjustable means for exerting pressure in either direction on said idle pulley.

3. A belt tightener comprising in combination with a drive shaft, a pulley thereon and a bearing for the shaft, of a frame oscillatable on the bearing, a flange on the frame, a plate rotatable on the bearing, an arm on said plate, means to adjustably secure said plate to the flange whereby the arm may be held at any radial angle and oscillate with the frame, a stud in said arm adjustable parallel to said shaft, an idler revoluble on the stud in register with said pulley, and adjustable means carried by said frame to yieldably swing said idler in either direction limitedly around the axis of said pulley.

4. A belt tightener comprising in combination with a drive shaft, a pulley thereon and a bearing for the shaft, of a frame oscillatable on the bearing having a lug, a weight carrying spindle adjustable and reversible in said lug, a flange on the side of the frame, said frame having a plurality of openings to receive bolts from said flange and provided with a radial arm having a slot, a stud adjustable in the slot, and an idler on the stud in register with said pulley, said idler being operative with respect to a belt trained over said pulley irrespective of its direction.

5. A belt tightener comprising in combination with a drive shaft, a bearing therefor and a pulley on said shaft adjacent the bearing, of a frame mounted to oscillate on the extending ends of said bearing, a plate pivoted intermediate said frame and pulley, said plate having a slotted arm, a stud adjustably held in the slot of said arm, an idler rotatable on said stud in register with said drive pulley, means for rigidly securing said plate and frame in relative angular adjustment, and a counterweight adjustably carried by said frame.

In testimony whereof I affix my signature.

ANTON E. NIELSEN.